(12) United States Patent
Suzuki

(10) Patent No.: US 10,921,213 B2
(45) Date of Patent: Feb. 16, 2021

(54) SCREENING APPARATUS FOR OPTICAL FIBER

(71) Applicant: FURUKAWA ELECTRIC CO., LTD., Tokyo (JP)

(72) Inventor: Takashi Suzuki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/575,656

(22) Filed: Sep. 19, 2019

(65) Prior Publication Data

US 2020/0011763 A1    Jan. 9, 2020

Related U.S. Application Data

(63) Continuation of application No. PCT/JP2018/012016, filed on Mar. 26, 2018.

(30) Foreign Application Priority Data

Mar. 31, 2017    (JP) .................. 2017-072607

(51) Int. Cl.
*G01M 11/08* (2006.01)
*G02B 6/44* (2006.01)
*H05F 3/06* (2006.01)

(52) U.S. Cl.
CPC ......... *G01M 11/088* (2013.01); *G02B 6/4457* (2013.01); *H05F 3/06* (2013.01); *B65H 2701/32* (2013.01)

(58) Field of Classification Search
CPC .... C03B 37/12; B65H 2701/32; G01J 1/0425; G02B 6/4486; H05F 3/00

(Continued)

(56) References Cited

U.S. PATENT DOCUMENTS 5,200,620 A * 4/1993 Peritt ................... D04H 3/03
250/225
2006/0140571 A1* 6/2006 Lee ..................... G02B 6/4464
385/147

(Continued)

FOREIGN PATENT DOCUMENTS

CN    1813211 A    8/2006
EP    2 498 111 A1    9/2012

(Continued)

OTHER PUBLICATIONS

International Search Report dated Jun. 12, 2018 in PCT/JP2018/012016 filed Mar. 26, 2018 (with English Translation).

(Continued)

*Primary Examiner* — David A Vanore
(74) *Attorney, Agent, or Firm* — Oblon, McClelland, Maier & Neustadt, L.L.P.

(57) ABSTRACT

A screening apparatus for an optical fiber includes a delivery unit that delivers an optical fiber; a screening unit that applies tension to the delivered optical fiber to perform screening of the optical fiber; a winding unit that winds the optical fiber after screening; and a static electricity removing unit that removes static electricity of the optical fiber traveling on the predetermined passage, the static electricity removing unit being disposed along a predetermined passage of a passage of the optical fiber from an exit side of the screening unit to an entry side of the winding unit.

4 Claims, 2 Drawing Sheets

(58) Field of Classification Search
USPC .......................... 250/325; 385/100, 123, 147
See application file for complete search history.

(56) References Cited

U.S. PATENT DOCUMENTS

| | | | |
|---|---|---|---|
| 2006/0147166 A1* | 7/2006 | Roba | B65H 49/02 |
| | | | 385/123 |
| 2012/0230642 A1* | 9/2012 | Bartholomaus | G02B 6/4457 |
| | | | 385/134 |
| 2017/0284862 A1* | 10/2017 | Nishi | G01J 1/42 |

FOREIGN PATENT DOCUMENTS

| | | | |
|---|---|---|---|
| JP | 04-357136 A | 12/1992 |
| JP | 08-110417 A | 4/1996 |
| JP | 10-114537 A | 5/1998 |
| JP | 2000-275139 A | 10/2000 |
| JP | 2006-178220 A | 7/2006 |
| JP | 2015-137995 A | 7/2015 |
| WO | WO 2004/050573 A1 | 6/2004 |

OTHER PUBLICATIONS

Written Opinion dated Jun. 12, 2018 in PCT/JP2018/012016 filed Mar. 26, 2018.
Office Action dated Jun. 4, 2019 in Japanese Patent Application No. 2017-072607 (with English Translation).
Office Action dated Sep. 24, 2020 in Chinese Application No. 201880021120.6, along with an English translation.

\* cited by examiner

SCREENING APPARATUS FOR OPTICAL FIBER

CROSS-REFERENCE TO RELATED APPLICATION(S)

This application is a continuation of International Application No. PCT/JP2018/012016, filed on Mar. 26, 2018 which claims the benefit of priority of the prior Japanese Patent Application No. 2017-072607, filed on Mar. 31, 2017, the entire contents of which are incorporated herein by reference.

BACKGROUND

The present disclosure relates to a screening apparatus for an optical fiber.

Generally, in a manufacturing process of an optical fiber, an optical fiber preform is heated and melted by a fiber drawing furnace so that a glass optical fiber is drawn, and a coating layer is formed on the outer circumference of the drawn glass optical fiber, so that an optical fiber is manufactured. The manufactured optical fiber is wound round on a bobbin. The optical fiber wound on the bobbin as described above is then wound round on another bobbin, such as a shipping bobbin. In a rewinding process of an optical fiber from a bobbin to another bobbin, a test, that is, screening is performed on the optical fiber to determine an optical fiber portion to which insufficient tensile strength is applied, by applying tension thereto.

The screening is performed by applying a predetermined tension to an optical fiber while guiding the optical fiber drawn from a bobbin in a previous stage along a pass line by a pulley or the like. The optical fiber screened as described above is then wound round on another (following) bobbin. Note that the pass line is a path through which an optical fiber drawn out from a bobbin in a previous stage passes until the optical fiber is wound (rewound) by a bobbin in a following stage through a pulley or the like.

By the way, in the pass line from when an optical fiber is drawn out to when the optical fiber is rewound after screening as described above, static electricity may be generated due to friction between the optical fiber and a pulley or the like. In particular, an optical fiber, which is made of an insulating material such as quartz glass or a coating resin, is easily charged with static electricity. When static electricity is generated in an optical fiber traveling along the pass line, adjacent windings of the optical fiber wound around a bobbin repel or attract each other, which may make it difficult for an optical fiber after screening to be wound round on a bobbin so that one turn is laid beside another. For example, when an optical fiber after screening is wound around a bobbin, a winding defect occurs locally in the optical fiber, due to local crossing and the like. Since the winding defect applies stress to the optical fiber wound around the bobbin, it causes not only deterioration in an optical transmission loss but also causes breakage of the optical fiber drawn out from the bobbin.

In order to solve a disadvantage of such a winding defect of an optical fiber, static electricity is removed from the optical fiber at a position of a bobbin on which the optical fiber after screening is wound round. For example, it is disclosed that a voltage is applied to an optical fiber immediately after being drawn out, so that an electric potential of the optical fiber on a bobbin is forced to be close to zero, thereby to remove static electricity (see Japanese Laid-open Patent Publication No. H8-110417).

SUMMARY

According to an aspect of the present disclosure, a screening apparatus for an optical fiber is provided which includes a delivery unit that delivers an optical fiber; a screening unit that applies tension to the delivered optical fiber to perform screening of the optical fiber; a winding unit that winds the optical fiber after screening; and a static electricity removing unit that removes static electricity of the optical fiber traveling on the predetermined passage, the static electricity removing unit being disposed along a predetermined passage of a passage of the optical fiber from an exit side of the screening unit to an entry side of the winding unit.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Embodiments of a screening apparatus for an optical fiber according to the present disclosure are described in the following with reference to the drawings. The embodiments are not intended to limit the disclosure. The drawings are schematic illustrations, and it should be noted that the relation between the sizes of the components and the ratio between the components may possibly be different from those in an actual configuration. The relation between the sizes and the ratio may possibly be different between the drawings. Additionally, in each of the drawings, like reference symbols are given to like or corresponding components.

Screening Apparatus for Optical Fiber

Figure 1:
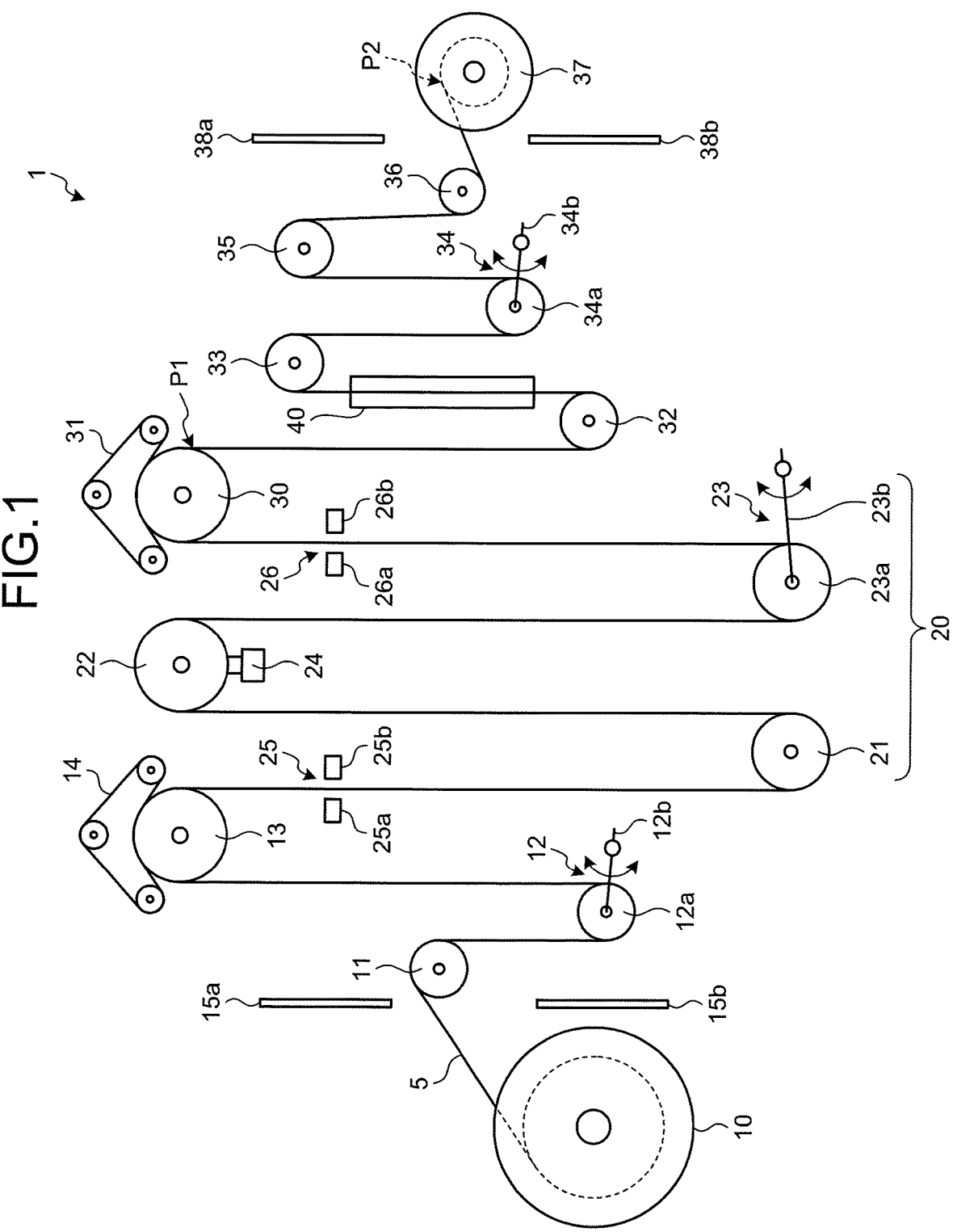
FIG. 1 is a schematic view illustrating a configuration example of a screening apparatus for an optical fiber according to an embodiment of the present disclosure.

First, a configuration and operation of a screening apparatus for an optical fiber according to an embodiment of the present disclosure will be described. FIG. 1 is a schematic view illustrating a configuration example of the screening apparatus for an optical fiber according to the embodiment of the present disclosure. As illustrated in FIG. 1, a screening apparatus 1 includes a delivery bobbin 10, a screening unit 20, and a winding bobbin 37. Further, the screening apparatus 1 includes a fixed pulley 11, a delivery dancer 12, a first capstan 13, and an endless belt 14 between the delivery bobbin 10 and the screening unit 20. Furthermore, the screening apparatus 1 is provided with anti-tapping plates 15a and 15b between the delivery bobbin 10 and the fixed pulley 11. Further, the screening apparatus 1 includes a second capstan 30, an endless belt 31, fixed pulleys 32, 33, and 35, a winding dancer 34, a guide pulley 36, and a static electricity removing unit 40 between the screening unit 20 and the winding bobbin 37. Furthermore, the screening apparatus 1 includes anti-tapping plates 38a and 38b between the guide pulley 36 and the winding bobbin 37.

The delivery bobbin 10 functions as a delivery unit that delivers an optical fiber 5. As illustrated in FIG. 1, the delivery bobbin 10 is in a state of winding up the optical fiber 5 manufactured in advance, and is attached to a shaft disposed at a start end of the screening apparatus 1. In the present embodiment, a length of the optical fiber 5 wound on the delivery bobbin 10 is, for example, about 300 km to 400 km. The delivery bobbin 10 has a drive unit (not illustrated), and is rotated in an outer circumferential direction by a driving force of the drive unit to sequentially deliver the optical fiber 5 toward the fixed pulley 11.

Note that the optical fiber 5 is an optical fiber to be screened, which is subjected to screening in a process of being rewound from the delivery bobbin 10 to the winding bobbin 37. As the optical fiber 5, for example, an optical fiber strand obtained by coating the outer circumference of a glass optical fiber, an optical fiber core wire manufactured from an optical fiber strand, and the like may be used.

The fixed pulley 11 is, for example, a pulley having the outer circumference with a concave cross section, and, as illustrated in FIG. 1, disposed rotatably around a rotation shaft at a predetermined position above the delivery bobbin 10. The optical fiber 5 delivered from the delivery bobbin 10 is wound around the outer circumference of the fixed pulley 11. While rotating at the predetermined position, the fixed pulley 11 sequentially guides and sends out the optical fiber 5 from the delivery bobbin 10 to a moving pulley 12a side of the delivery dancer 12 from the delivery bobbin 10 side. At this time, the fixed pulley 11 suppresses a shift (that is, meandering) of the optical fiber 5 to a rotation shaft direction. This function of suppressing the meandering of the optical fiber 5 is similar to that of other pulleys (for example, the moving pulley 12a and the like) having the outer circumference with a concave cross section.

As illustrated in FIG. 1, the delivery dancer 12 includes a moving pulley 12a and a support 12b and is disposed at a position below the fixed pulley 11. The moving pulley 12a is, for example, a pulley having the outer circumference with a concave cross section, and is configured to be rotatable about a rotation shaft. The support 12b rotatably supports the rotation shaft of the moving pulley 12a at a tip end portion, and has a pivot shaft parallel to the rotation shaft of the moving pulley 12a at a base portion. As illustrated in FIG. 1, the support 12b is disposed at a position below the fixed pulley 11 so as to be pivotable about a pivot shaft of the base portion. The moving pulley 12a moves up and down appropriately along with the rotation of the support 12b in a state where the optical fiber 5 is wound around the outer circumference. The delivery dancer 12 sequentially guides and sends out the optical fiber 5 from the fixed pulley 11 to the first capstan 13 side from the fixed pulley 11 side by the rotation of the moving pulley 12a. At this time, the delivery dancer 12 adjusts the tension of the optical fiber 5 traveling toward the first capstan 13 from the delivery bobbin 10 through the fixed pulley 11 and the moving pulley 12a by vertical movement of the moving pulley 12a. In this manner, the delivery dancer 12 allows the optical fiber 5 to travel smoothly by suppressing slack or the like of the optical fiber 5 during travel.

The first capstan 13 is for sending out the optical fiber 5 delivered from the delivery bobbin 10 to the screening unit 20. As illustrated in FIG. 1, the first capstan 13 is disposed at a predetermined position above the delivery bobbin 10, the fixed pulley 11, and the delivery dancer 12 described above. The endless belt 14 configured to be rotatable by a rotating body or the like is pressed against an outer circumferential surface (an outer circumferential surface on an upper side in the present embodiment) of the first capstan 13. The first capstan 13 has a drive unit (not illustrated), and is rotated in an outer circumferential direction by a driving force of the drive unit while sandwiching the optical fiber 5 with the endless belt 14. At this time, the endless belt 14 rotates in the opposite direction to the first capstan 13. The first capstan 13 sequentially guides and sends out the optical fiber 5 from the moving pulley 12a of the delivery dancer 12 to the screening unit 20 side from the delivery dancer 12 side while sandwiching the optical fiber 5 in cooperation with the endless belt 14.

In the present embodiment, the rotation shafts of the delivery bobbin 10, the fixed pulley 11, the moving pulley 12a of the delivery dancer 12, the first capstan 13, and the endless belt 14 are parallel to one another. Further, the pivot shaft of the support 12b of the delivery dancer 12 is parallel to the above rotation shafts.

The anti-tapping plates 15a and 15b are positioned on an upper side and a lower side of the optical fiber 5 bridged from the delivery bobbin 10 to the fixed pulley 11 with plate surfaces directed to the screening unit 20 side, as illustrated in FIG. 1. In a case where the optical fiber 5 delivered from the delivery bobbin 10 is disconnected, the anti-tapping plates 15a and 15b prevent a disconnected portion of the optical fiber 5 from striking a normal portion of the optical fiber 5 in the pass line or in the delivery bobbin 10.

The screening unit 20 applies a tension to the optical fiber 5 delivered from the delivery bobbin 10 to screen the optical fiber 5. As illustrated in FIG. 1, the screening unit 20 has an entry-side fixed pulley 21, an intermediate pulley 22, a tension applying portion 23, a tension meter 24, a first disconnection sensor 25, and a second disconnection sensor 26. The screening unit 20 is disposed at a position in a passage (pass line) of the optical fiber 5 from the delivery bobbin 10 to the winding bobbin 37, specifically, a position between the first capstan 13 and the second capstan 30.

The entry-side fixed pulley 21 is, for example, a pulley having the outer circumference with a concave cross section, and, as illustrated in FIG. 1, disposed rotatably around a rotation shaft at a predetermined position lower than the first capstan 13 (lower than the delivery bobbin 10 and delivery dancer 12 in the present embodiment). The optical fiber 5 sent out from the first capstan 13 is wound around the outer circumference of the entry-side fixed pulley 21. While rotating at the predetermined position, the entry-side fixed pulley 21 sequentially guides and sends out the optical fiber 5 from the first capstan 13 to the intermediate pulley 22 side from the first capstan 13 side.

The intermediate pulley 22 is, for example, a pulley having the outer circumference with a concave cross section, and, as illustrated in FIG. 1, disposed rotatably around a rotation shaft at a position above the entry-side fixed pulley 21 (at the same height position as the first capstan 13 in the present embodiment). The optical fiber 5 sent out from the entry-side fixed pulley 21 is wound around the outer circumference of the intermediate pulley 22. The intermediate pulley 22 sequentially guides and sends out the optical fiber 5 from the entry-side fixed pulley 21 to a moving pulley 23a side of the tension-applying portion 23 from the side of the entry-side fixed pulley 21 while rotating around the rotation shaft. Further, the intermediate pulley 22 is also used to measure the tension of the optical fiber 5 at the time of screening.

The tension-applying portion 23 applies a tension to the optical fiber 5 traveling along the pass line in the screening unit 20. As illustrated in FIG. 1, the tension-applying portion 23 includes the moving pulley 23a and a support 23b, and is disposed below the intermediate pulley 22. For example, the tension-applying portion 23 is disposed such that the moving pulley 23a moves up and down in the vicinity of the height position of the entry-side fixed pulley 21 described above. The moving pulley 23a is, for example, a pulley having the outer circumference with a concave cross section, and is configured to be rotatable about a rotation shaft. The support 23b rotatably supports the rotation shaft of the moving pulley 23a at a tip end portion, and has a pivot shaft parallel to the rotation shaft of the moving pulley 23a at a base portion. As illustrated in FIG. 1, the support 23b is disposed at a position below the intermediate pulley 22 (at almost the same height position as the entry-side fixed pulley 21 in the present embodiment) so as to be pivotable about a pivot shaft of the base portion. The moving pulley 23a moves up and down together with the rotation of the support 23b in a state where the optical fiber 5 is wound around the outer circumference. The tension-applying portion 23 sequentially guides and sends out the optical fiber 5 from the intermediate pulley 22 to the second capstan 30 side from the intermediate pulley 22 side by the rotation of the moving pulley 23a. At the same time, the tension applying portion 23 applies a tension to the optical fiber 5 traveling toward the second capstan 30 from the first capstan 13 through the entry-side fixed pulley 21, the intermediate pulley 22, and the moving pulley 23a by the vertical movement of the moving pulley 23a (mainly downward movement of the moving pulley 23a by its own weight). By the action of the tension-applying portion 23 as described above, screening (test of tension resistance performance) is performed on the optical fiber 5.

The tension meter 24 is configured using, for example, a load cell or the like, and is provided on the intermediate pulley 22 as illustrated in FIG. 1. The tension meter 24 measures the tension of the optical fiber 5 at the time of screening based on a load applied to the intermediate pulley 22 and the like accompanying the tension being applied on the optical fiber 5. The tension applied to the optical fiber 5 at the time of screening by the tension applying portion 23 described above is controlled to be constant by a control unit (not illustrated) or the like based on a measurement result of the tension by the tension meter 24.

The first disconnection sensor 25 and the second disconnection sensor 26 detect disconnection of the optical fiber 5 at the time of screening. As illustrated in FIG. 1, the first disconnection sensor 25 includes a light source unit 25a and a light receiving unit 25b, and is disposed between the first capstan 13 and the entry-side fixed pulley 21. The first disconnection sensor 25 detects disconnection of the optical fiber 5 based on a change in an amount of received light of light transmitted and received between the light source unit 25a and the light receiving unit 25b via the optical fiber 5 during screening. Further, the second disconnection sensor 26 has a light source unit 26a and a light receiving unit 26b, and is disposed between the moving pulley 23a of the tension-applying portion 23 and the second capstan 30. The second disconnection sensor 26 detects disconnection of the optical fiber 5 based on a change in an amount of received light of light transmitted and received between the light source unit 26a and the light receiving unit 26b via the optical fiber 5 during screening.

The first disconnection sensor 25 and the second disconnection sensor 26 are not limited to the above-described disconnection sensors of an optical system, and may be a disconnection sensor of a system other than an optical system, such as a disconnection sensor of a contact system. Further, the number of disconnection sensors provided in the screening unit 20 is not limited to two as described above, and may be one or more. Furthermore, a disposed location of the disconnection sensor in the screening unit 20 is not limited to that illustrated in FIG. 1, and can be appropriately changed to a desired position along the pass line between the first capstan 13 and the second capstan 30.

In the present embodiment, the rotation shafts of the above-described entry-side fixed pulley 21, the intermediate pulley 22, and the moving pulley 23a of the tension applying portion 23 are parallel to the rotation shaft of the first capstan 13. Further, the pivot shaft of the support 23b of the tension-applying portion 23 is parallel to the above rotation shafts.

The second capstan 30 is for sending out the optical fiber 5 after screening by the screening unit 20 toward the winding bobbin 37 side. As illustrated in FIG. 1, the second capstan 30 is disposed at a predetermined position above the moving pulley 23a of the tension applying portion 23 described above (in the present embodiment, at the same height as the first capstan 13). The endless belt 31 configured to be rotatable by a rotating body or the like is pressed against an outer circumferential surface (an outer circumferential surface on an upper side in the present embodiment) of the second capstan 30. The second capstan 30 has a drive unit (not illustrated), and is rotated in an outer circumferential direction by a driving force of the drive unit while sandwiching the optical fiber 5 after screening with the endless belt 31. At this time, the endless belt 31 rotates in the opposite direction to the second capstan 30. The second capstan 30 sequentially guides and sends out the optical fiber 5 after screening to the fixed pulley 32 side from the moving pulley 23a side of the tension-applying portion 23 while sandwiching the optical fiber 5 in cooperation with the endless belt 31.

The fixed pulley 32 is, for example, a pulley having the outer circumference with a concave cross section, and, as illustrated in FIG. 1, disposed rotatably around a rotation shaft at a predetermined position lower than the second capstan 30 (lower than the winding dancer 34 in the present embodiment). The optical fiber 5 after screening sent out from the second capstan 30 is wound around the outer circumference of the fixed pulley 32. While rotating at the predetermined position, the fixed pulley 32 sequentially guides and sends out the optical fiber 5 from the second capstan 30 to the fixed pulley 33 side from the second capstan 30 side.

The fixed pulley 33 is, for example, a pulley having the outer circumference with a concave cross section, and, as illustrated in FIG. 1, disposed rotatably around a rotation shaft at a predetermined position above the fixed pulley 32 on an upstream side (at a height position between the second capstan 30 and the fixed pulley 32 in the present embodiment). The optical fiber 5 after screening sent out from the fixed pulley 32 on an upstream side is wound around the outer circumference of the fixed pulley 33. While rotating at this predetermined position, the fixed pulley 33 sequentially guides and sends out the optical fiber 5 from the fixed pulley 32 on an upstream side to the winding dancer 34 side from the fixed pulley 32 side on an upstream side.

As illustrated in FIG. 1, the winding dancer 34 includes a moving pulley 34a and a support 34b and is disposed at a position below the fixed pulley 33. The moving pulley 34a is, for example, a pulley having the outer circumference with a concave cross section, and is configured to be rotatable about a rotation shaft. The support 34b rotatably supports the rotation shaft of the moving pulley 34a at a tip end portion, and has a pivot shaft parallel to the rotation shaft of the moving pulley 34a at a base portion. As illustrated in FIG. 1, the support 34b is disposed at a position below the fixed pulley 33 so as to be pivotable about a pivot shaft of the base portion. The moving pulley 34a moves up and down appropriately along with the rotation of the support 34b in a state where the optical fiber 5 after screening is wound around the outer circumference. In the present embodiment, the moving pulley 34a moves up and down between the fixed pulley 32 on a lower side and the fixed pulley 33 on an upper side. The winding dancer 34 sequentially guides and sends out the optical fiber 5 from the fixed pulley 33 on an upstream side to the fixed pulley 35 side on a downstream side from the fixed pulley 33 side on an upstream side by rotation of the moving pulley 34a. At this time, the winding dancer 34 adjusts the tension of the optical fiber 5 traveling from the second capstan 30 through the fixed pulleys 32 and 33 and the moving pulley 34a toward the fixed pulley 35 by the vertical movement of the moving pulley 34a. In this manner, the winding dancer 34 allows the optical fiber 5 to travel smoothly by suppressing slack or the like of the optical fiber 5 during travel.

The fixed pulley 35 is, for example, a pulley having the outer circumference with a concave cross section, and, as illustrated in FIG. 1, disposed rotatably around a rotation shaft at a predetermined position above the moving pulley 34a of the winding dancer 34 (at a height position almost the same as the fixed pulley 33 in the present embodiment). The optical fiber 5 after screening sent out from the moving pulley 34a is wound around the outer circumference of the fixed pulley 35. While rotating at this predetermined position, the fixed pulley 35 sequentially guides and sends out the optical fiber 5 from the moving pulley 34a to the guide pulley 36 side from the winding dancer 34 side.

The guide pulley 36 is, for example, a fixed pulley having the outer circumference with a concave cross section, and, as illustrated in FIG. 1, disposed rotatably around a rotation shaft at a predetermined position below the fixed pulley 35. The optical fiber 5 after screening sent out from the fixed pulley 35 is wound around the outer circumference of the guide pulley 36. In the present embodiment, as illustrated in FIG. 1, a lower end of a winding position of the optical fiber 5 in the guide pulley 36 is lower than an upper end of the winding position of the optical fiber 5 on the winding bobbin 37. In this manner, slack of the optical fiber 5 stretched between the guide pulley 36 and the winding bobbin 37 is suppressed. While rotating at this predetermined position, the guide pulley 36 sequentially guides and sends out the optical fiber 5 from the fixed pulley 35 to the winding bobbin 37 side from the fixed pulley 35 side.

The winding bobbin 37 functions as a winding unit that winds up the optical fiber 5 after screening by the screening unit 20. In the present embodiment, the winding bobbin 37 is a small bobbin compared to the delivery bobbin 10 described above, such as a shipping bobbin or the like, and disposed at an end of the screening apparatus 1 as illustrated in FIG. 1. The winding bobbin 37 has a drive unit (not illustrated), and sequentially winds up in a coil shape the optical fiber 5 after screening sent out from the guide pulley 36 while rotating in the outer circumferential direction by a driving force of the drive unit. For example, a length of the optical fiber 5 wound up by the winding bobbin 37 is about 50 km.

In the present embodiment, the rotation shafts of the above-mentioned fixed pulleys 32, 33, and 35, moving pulley 34a of the winding dancer 34, guide pulley 36, and winding bobbin 37 are parallel with respect to the rotation shaft of the second capstan 30. Further, the pivot shaft of the support 34b of the winding dancer 34 is parallel to the above rotation shafts The static electricity removing unit 40 is disposed along a predetermined passage of the passage of the optical fiber 5 from an exit side of the screening unit 20 to an entry side of the winding bobbin 37, and removes static electricity of the optical fiber 5 traveling along the predetermined passage. Specifically, as illustrated in FIG. 1, the static electricity removing unit 40 is disposed along the pass line between the fixed pulley 32 and the fixed pulley 33 located on a downstream side of the screening unit 20 in the entire passage (pass line) of the optical fiber 5 from the delivery bobbin 10 of the screening apparatus 1 to the winding bobbin 37 through the screening unit 20. That is, in the present embodiment, the pass line between the fixed pulley 32 and the fixed pulley 33 is set as a preferable example of the predetermined passage. The static electricity removing unit 40 supplies, for example, ionized gas to the optical fiber 5 after screening traveling on the predetermined passage to remove static electricity of the traveling optical fiber 5. Note that the ionized gas is gas, such as air that is ionized by applying a voltage. The optical fiber 5 from which static electricity is removed by the static electricity removing unit 40 travels along the pass line on a downstream side of the screening unit 20 in a state where generation of static electricity is suppressed without passing through the pass line (pass line where static electricity due to friction is easily generated) in the screening unit 20, and is wound by the winding bobbin 37.

Here, as illustrated in FIG. 1, the entire pass line of the optical fiber 5 in the screening apparatus 1 is a passage that passes, from the delivery bobbin 10 up to the winding bobbin 37 through the fixed pulley 11, the moving pulley 12a, the first capstan 13 and the endless belt 14, the entry-side fixed pulley 21, the intermediate pulley 22, the moving pulley 23a, the second capstan 30 and the endless belt 31, the fixed pulley 32, the fixed pulley 33, the moving pulley 34a, the fixed pulley 35, and the guide pulley 36 in this order in a zigzag in a vertical direction. Further, in the present embodiment, a position on an exit side of the screening unit 20 is a position P1 at which the second capstan 30 starts sending out the optical fiber 5 after screening to a downstream side of the screening unit 20. The position on an entry side of the winding bobbin 37 is a position P2 at which the winding bobbin 37 starts winding the optical fiber 5 after screening. Accordingly, in the entire pass line of the optical fiber 5, the pass line of the optical fiber 5 from the exit side of the screening unit 20 to the entry side of the winding bobbin 37 is a passage from the position P1 of the second capstan 30 illustrated in FIG. 1 to the position P2 of the winding bobbin 37 through the fixed pulley 32, the fixed pulley 33, the moving pulley 34a, the fixed pulley 35, and the guide pulley 36 in this order.

In the pass line of the optical fiber 5 from the exit side of the screening unit 20 to the entry side of the winding bobbin 37, the predetermined passage where the static electricity removing unit 40 is disposed is alternatively set from among a pass line (first pass line) between the position P1 of the second capstan 30 and the fixed pulley 32, a pass line (second pass line) between the fixed pulley 32 and the fixed pulley 33, a pass line (third pass line) between the fixed pulley 33 and the moving pulley 34a, a pass line (fourth pass line) between the moving pulley 34a and the fixed pulley 35, a pass line (fifth pass line) between the fixed pulley 35 and the guide pulley 36, and a pass line (sixth pass line) between the guide pulley 36 and the position P2 of the winding bobbin 37. Further, as the predetermined passage, a pass line that satisfies all conditions that a distance of a path necessary for removing static electricity from the optical fiber 5 after screening by the static electricity removing unit 40 may be ensured (first condition), the distance of the path does not change and is stable (second condition), and the passage is relatively close to the winding bobbin (third condition) is preferable.

Among the first to sixth pass lines described above, from the viewpoint of satisfying the first condition, the first pass line to the fourth pass line in which the distance of the path can be easily ensured are preferable to the fifth pass line and the sixth pass line that should be shortened for winding up the optical fiber 5 in alignment while suppressing the generation of static electricity. Among the first pass line to the fourth pass line, from the viewpoint of satisfying the second condition, the first pass line and the second pass line in which the distance of the path is stable are more preferable to the third pass line and the fourth pass line in which the distance of the path changes due to the moving pulley 34a. Between the first pass line and the second pass line, from the viewpoint of satisfying the third condition, the second pass line closer to the winding bobbin 37 is further preferable to the first pass line. As a result of the above, in the present embodiment, the second pass line that satisfies all of the first to third conditions, that is, the pass line between the fixed pulley 32 and the fixed pulley 33 is selected as the predetermined passage where the static electricity removing unit 40 is disposed.

Static Electricity Removing Unit

Figure 2:
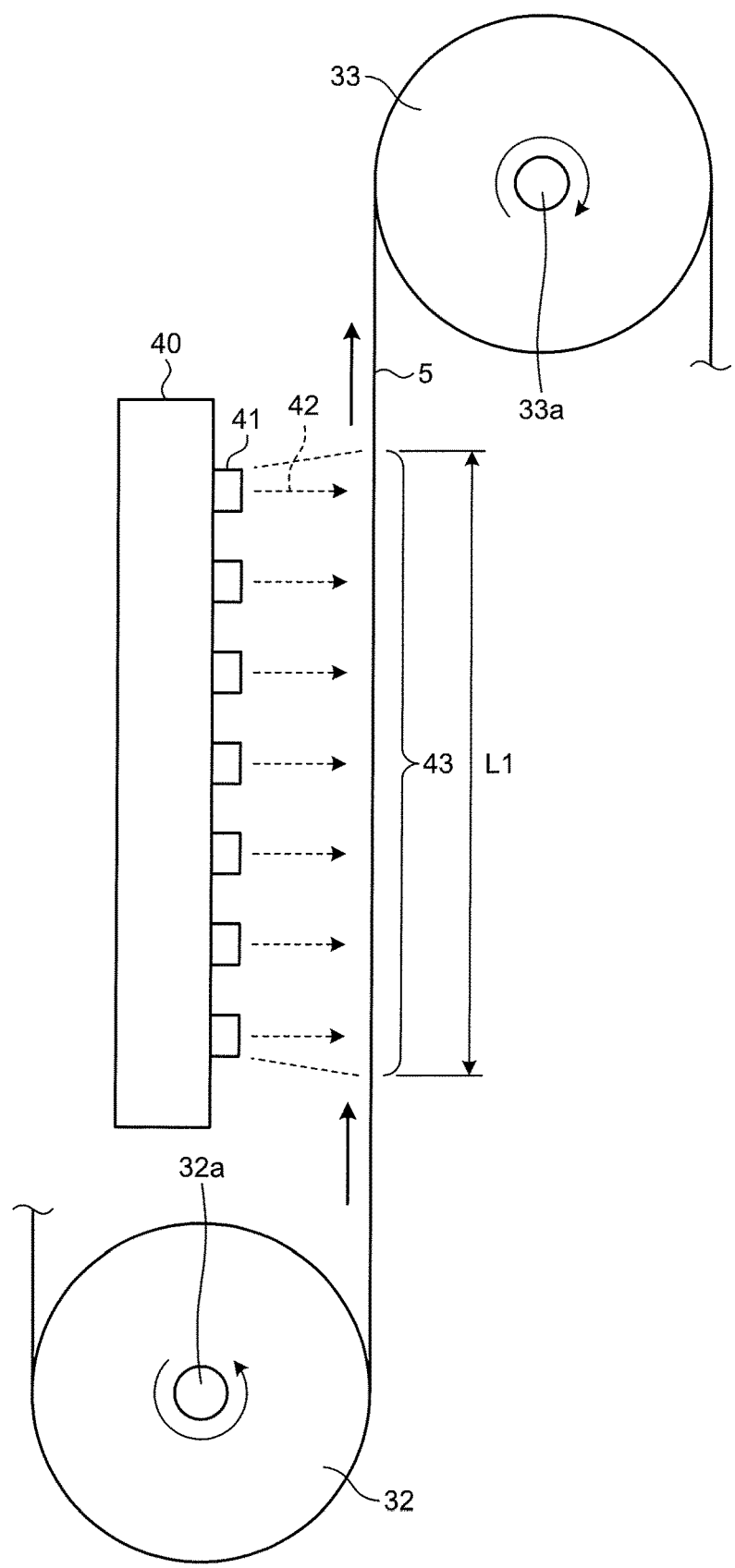
FIG. 2 is a schematic view illustrating a configuration example of a static electricity removing unit in the screening apparatus for an optical fiber according to the embodiment of the present disclosure.

Next, the static electricity removing unit 40 according to the embodiment of the present disclosure will be described in detail. FIG. 2 is a schematic view illustrating a configuration example of the static electricity removing unit in the screening apparatus for an optical fiber according to the embodiment of the present disclosure. FIG. 2 illustrates a view of the static electricity removing unit 40 as viewed in the rotation shaft direction of the fixed pulleys 32 and 33 illustrated in FIG. 1. Further, as described above, the optical fiber 5 whose static electricity is removed by the static electricity removing unit 40 illustrated in FIG. 2 is the optical fiber after screening by the screening unit 20 (see FIG. 1). Hereinafter, in the description of the static electricity removing unit 40, the optical fiber 5 means the "optical fiber after screening".

As illustrated in FIG. 2, the static electricity removing unit 40 has a plurality of (seven in the present embodiment) jetting ports 41 for injecting ionized gas 42. On the static electricity removing unit 40, a plurality of the jetting ports 41 are disposed along a pass line (the predetermined passage) between the fixed pulley 32 and the fixed pulley 33 so as to be arranged adjacent to each other in the traveling direction of the optical fiber 5 and face the traveling optical fiber 5. The traveling direction of the optical fiber 5 is a direction of the pass line from one fixed pulley 32 to the other fixed pulley 33, as illustrated by a solid arrow in FIG. 2. Note that, although a plurality of the jetting ports 41 are preferably arranged at equal intervals, the configuration is not limited to this.

The static electricity removing unit 40 obtains the ionized gas 42 by receiving the ionized gas 42 via a cable or the like (not illustrated) or applies a voltage to predetermined gas, such as air, to generate the ionized gas 42. The static electricity removing unit 40 jets the acquired ionized gas 42 from each of a plurality of the jetting ports 41 as illustrated in FIG. 2. In this manner, the static electricity removing unit 40 continuously supplies the ionized gas 42 to the optical fiber 5 that is traveling through a static elimination path 43 in the pass line between the fixed pulley 32 and the fixed pulley 33.

Here, the static elimination path 43 is a pass line where static electricity is removed from the optical fiber 5 by the static electricity removing unit 40 in the pass line between the fixed pulley 32 and the fixed pulley 33 as the predetermined passage described above. In the present embodiment, as illustrated in FIG. 2, a pass line in which the ionized gas 42 is continuously supplied to the traveling optical fiber 5 is the static elimination path 43. The static electricity removing unit 40 supplies by continuously jetting the ionized gas 42 to an arbitrary portion of the optical fiber 5 traveling on the pass line between the fixed pulley 32 and the fixed pulley 33, during a period from when the arbitrary portion enters the static elimination path 43 until the arbitrary portion finishes passing through the static elimination path 43. In this manner, the static electricity removing unit 40 removes static electricity from an arbitrary portion of the optical fiber 5. The static elimination time for static electricity by the static electricity removing unit 40 is preferably 0.006 seconds or more and 0.010 seconds or less. Further, a distance L1 of the static elimination path 43 illustrated in FIG. 2 is set by the static elimination time required to remove static electricity from an arbitrary portion of the optical fiber 5 by the static electricity removing unit 40, and a traveling speed (linear speed) of the optical fiber 5. The distance L1 of the static elimination path 43 is preferably 150 mm or more from the viewpoint of ensuring the static elimination time. In the present embodiment, the distance L1 of the static elimination path 43, that is, an effective length of a region where the static electricity removing unit 40 can jet and supply the ionized gas 42 is, for example, 324 mm. Further, a linear speed of the optical fiber 5 is, for example, 1750 m/min.

Every time the optical fiber 5 travels the static elimination path 43, the static electricity removing unit 40 continuously performs removing processing for static electricity of an arbitrary portion by the jet supply of the ionized gas 42 described above over the entire length of the traveling optical fiber 5. At this time, as illustrated in FIG. 2, the static electricity removing unit 40 preferably jets the ionized gas 42 to the traveling optical fiber 5 in a direction perpendicular to an axial direction (direction perpendicular to the sheet of FIG. 2) of rotation shafts 32a and 33a of the fixed pulleys 32 and 33. This is because even if the optical fiber 5 is slackened by the jet of the ionized gas 42, the slack of the optical fiber 5 can be absorbed by the fixed pulleys 32 and 33, the winding dancer 34, and the like as long as the ionized gas 42 is jetted in the direction perpendicular to the axial direction of the rotation shafts 32a and 33a of the fixed pulleys 32 and 33. Conversely, in a case where the ionized gas 42 is jetted in the axial direction of the rotation shafts 32a and 33a of the fixed pulleys 32 and 33, a certain amount of slack can be absorbed by the fixed pulleys 32 and 33, the winding dancer 34, and the like. However, the optical fiber 5 slacks while rubbing on pulleys, such as the fixed pulleys 32 and 33, in the axial direction of their rotation shafts, which is not preferable. However, if the tension applied to the optical fiber 5 is sufficiently strong against a force (wind pressure) of the jet of the ionized gas 42, the slack of the optical fiber 5 does not need to be considered much, and the direction of the jet of the ionized gas 42 is not limited.

Further, the static electricity removing unit 40 may be configured to stop jetting the ionized gas 42 based on a disconnection detection signal transmitted from the first disconnection sensor 25 or the second disconnection sensor 26 in a case where the optical fiber 5 is disconnected.

As described above, in the embodiment of the present disclosure, the screening unit 20 performs screening while the optical fiber 5 delivered from the delivery bobbin 10 is caused to travel along the pass line, the static electricity removing unit 40 removes static electricity of the traveling optical fiber 5 after screening in the predetermined passage of the pass line from the position P1 on the exit side of the screening unit 20 to the position P2 on the entry side of the winding bobbin 37, and the optical fiber 5 after static electricity removal is wound by the winding bobbin 37 while traveling along the pass line from the predetermined passage to the downstream side.

For this reason, the static electricity with which the optical fiber 5 after screening is charged, in particular, the static electricity generated on the optical fiber 5 due to friction with various pulleys when a tension is applied to the traveling optical fiber 5 stretched between pulleys and screening is performed can be removed from a line of the optical fiber 5 in a traveling direction (longitudinal direction) in the pass line from the exit side of the screening unit 20 to the entry side of the winding bobbin 37. Furthermore, the optical fiber 5 after the static electricity removal can be sequentially wound by the winding bobbin 37 without traveling along the pass line in the screening unit 20 where static electricity is easily generated. Accordingly, static electricity can be efficiently removed over the entire length of a series of windings of the optical fiber 5 adjacent to each other wound by the winding bobbin 37. In this manner, static electricity can be sufficiently removed from the optical fiber 5 after screening to an extent effective for preventing a winding defect, and, as a result, the optical fiber 5 can be aligned and wound on the winding bobbin 37 while generation of winding defects, such as a kink, is suppressed as much as possible.

In order to confirm the effect of the present disclosure, the experiment described below was conducted. That is, by using the screening apparatus 1 (see FIG. 1) to which the configuration of the present disclosure is applied, static electricity of the traveling optical fiber 5 after screening was removed by the static electricity removing unit 40 in the predetermined passage in the pass line from the position P1 on the exit side of the screening unit 20 to the position P2 on the entry side of the winding bobbin 37. A plurality of the optical fibers 5 after the static electricity removal which were wound around the winding bobbin 37 over the entire length (50 km) were prepared as experimental samples. Further, a plurality of the optical fibers 5, which were obtained in such a manner that removal of static electricity from the optical fiber 5 after screening was not performed in the middle of the pass line, and the static electricity of the optical fiber 5 in a state of being wound around the winding bobbin 37 was collectively removed by the jet supply of the ionized gas 42, were prepared as comparative samples to be compared with the experimental samples. After the above, for each of the experimental samples and the comparative samples, an occurrence rate of a step that appears in a measured waveform according to a disconnection or winding defect of the optical fiber 5 after being wound was investigated by an optical time domain reflectometer (OTDR). As a result, in the comparative samples, the occurrence rate of the step (the occurrence rate in 100 samples) was 15%. In contrast, in the experimental samples, the occurrence rate of the step was 1% or less. From the above, in the experimental samples according to the present disclosure, it was confirmed that a winding defect of the optical fiber 5 after being wound is suppressed or prevented by the reduction of the occurrence rate of the step as compared with the comparative samples.

Note that, in the embodiment described above, the static electricity removing unit 40 is disposed along the pass line (second pass line) between the fixed pulley 32 and the fixed pulley 33 located on the downstream side of the screening unit 20. However, the present disclosure is not limited to the above. The pass line on which the static electricity removing unit 40 is disposed may be any of the first to sixth pass lines described above. Further, the arrangement and the number of various pulleys positioned downstream of the screening unit 20 may be changed from those illustrated in FIG. 1, a pass line that satisfies the above-described first to third conditions may be selected as the predetermined passage from among a plurality of pass lines of the various pulleys after the change, and the static electricity removing unit 40 may be disposed along the selected predetermined passage.

Further, in the above-described embodiment, the static electricity removing unit 40 of a non-contact type that jets and supplies the ionized gas 42 to the optical fiber 5 after screening to remove static electricity is illustrated, however the present disclosure is limited to the above. The static electricity removing unit 40 may be a contact type that removes the static electricity of the optical fiber 5 by bringing a member, such as a conductive thin wire, into contact with the optical fiber 5 after screening. However, in view of the possibility that the tension of the optical fiber 5 fluctuates due to the contact between the traveling optical fiber 5 and the conductive thin wire and the like, the static electricity removing unit 40 is preferably a non-contact type.

Furthermore, in the above-described embodiment, the static electricity removing unit 40 having a plurality of the jetting ports 41 is illustrated, however the present disclosure is not limited to the above. The number of jetting ports provided on the static electricity removing unit 40 is not limited to seven as illustrated in FIG. 2, and may be one, or two or more. Further, the static electricity removing unit 40 may have one or more slit-like jetting ports that are long along the pass line.

Further, in the above-described embodiment, the static electricity removing unit 40 that jets the ionized gas 42 in an axial direction of a rotation shaft of a pulley is illustrated, however the present disclosure is limited to the above. The jetting direction of the ionized gas 42 by the static electricity removing unit 40 may be parallel, perpendicular, or oblique to an axial direction of a rotation shaft of a pulley as long as the jetting direction is toward the traveling optical fiber 5.

Further, the present disclosure is not limited by the embodiment described above. The present disclosure also includes those configured by appropriately combining the above-described constituents. In addition, other embodiments, examples, operation techniques, and the like made by those skilled in the art based on the above-described embodiment are all included in the scope of the present disclosure.

According to the present disclosure, static electricity can be sufficiently removed from an optical fiber after screening to an extent effective for preventing a winding defect, and, as a result, an advantageous effect that the optical fiber can be aligned and wound on a winding bobbin is achieved.

As described above, the screening apparatus for an optical fiber according to the present disclosure is for a screening apparatus for an optical fiber capable of sufficiently removing static electricity from an optical fiber after screening and aligning and winding the optical fiber on a winding bobbin.

What is claimed is:

1. A screening apparatus for an optical fiber comprising:
a delivery bobbin that delivers an optical fiber;
a screener that applies tension to the delivered optical fiber to perform screening of the optical fiber;
a winding bobbin that winds the optical fiber after the screening; and
a static electricity remover that removes static electricity of the optical fiber traveling on a predetermined passage of the optical fiber, the static electricity remover being disposed along the predetermined passage from an exit side of the screener to an entry side of the winding bobbin, wherein
the predetermined passage is one of a plurality of passages, which are provided between two pulleys,
the static electricity remover removes static electricity of the predetermined passage, and
the predetermined passage among the plurality of passages satisfies the following conditions:
1) a distance of the predetermined passage is ensured for removing static electricity from the optical fiber after the screening by the static electricity remover;
2) the distance of the predetermined passage does not change and is stable; and
3) the predetermined passage is arranged closer to the winding bobbin than at least one of the rest of the plurality of passages.

2. The screening apparatus for an optical fiber according to claim 1, wherein static elimination time for the static electricity by the static electricity remover is 0.006 seconds or more and 0.010 seconds or less.

3. The screening apparatus for an optical fiber according to claim 1, wherein a distance of a static elimination path, in which the static electricity remover removes the static electricity, of the predetermined passage, is 150 mm or more.

4. The screening apparatus for an optical fiber according to claim 1, wherein the static electricity remover supplies ionized gas to the optical fiber traveling on the predetermined passage to remove the static electricity.

* * * * *